United States Patent
Blackburn (10) Patent No.: US 7,139,255 B1
(45) Date of Patent: Nov. 21, 2006

(54) BANDWIDTH GROOMING FUNCTIONALITY IN AN ACCESS NETWORK ELEMENT

(75) Inventor: Bracy James Blackburn, Garland, TX (US)

(73) Assignee: Alcatel, Paris (FR)

( * ) Notice: Subject to any disclaimer, the term of this patent is extended or adjusted under 35 U.S.C. 154(b) by 1002 days.

(21) Appl. No.: 10/094,260

(22) Filed: Mar. 8, 2002

(51) Int. Cl.
*H04Q 7/00* (2006.01)

(52) U.S. Cl. .................. 370/331; 370/320; 370/328; 370/332; 370/334; 370/335; 370/342

(58) Field of Classification Search ............. None
See application file for complete search history.

(56) References Cited

U.S. PATENT DOCUMENTS 6,333,940 B1 * 12/2001 Baydar et al. ............ 370/506
6,870,813 B1 * 3/2005 Raza et al. ............... 370/238

* cited by examiner

*Primary Examiner*—Chi Pham
*Assistant Examiner*—Raj Jain
(74) *Attorney, Agent, or Firm*—Danamraj & Youst, P.C.; Bobby D. Slaton; V. Lawrence Sewell (57) ABSTRACT

A solution for providing bandwidth grooming functionality in an access network element in order to reduce the amount of data storage required by a switching module disposed therein. Each communication link coupled to the switching module is identified by an address identifier. An allocation storage unit is operable to store the addresses of a select subset of the links in response to a control unit. A multiplexer is provided for selecting the links based on the stored addresses for transmitting data to a data storage unit coupled to the switching module, thereby obviating the need for a much larger data storage unit.

22 Claims, 6 Drawing Sheets

BANDWIDTH GROOMING FUNCTIONALITY IN AN ACCESS NETWORK ELEMENT

BACKGROUND OF THE INVENTION

1. Technical Field of the Invention

The present invention generally relates to telecommunications. More particularly, and not by way of limitation, the present invention is directed to bandwidth grooming functionality in an access network element.

2. Description of Related Art

The remote access market is undergoing a major metamorphosis. Three factors serve as catalysts for change. The first is the growing number of users, for example, small office/home office (SOHO) users, demanding high performance Internet and remote access for multimedia. Liberalized governmental activity with respect to telecommunications is another factor, which is fostering broader competition through deregulation in local area markets everywhere. The third and final factor is congestion in the Public Switched Telephone Network (PSTN), originally designated and developed for voice-only traffic.

There have been several important advances in telecommunications technology that enable high rates of throughput in carrier networks' backbone connections. For example, by implementing Asynchronous Transfer Mode (ATM) networking technology over a Synchronous Optical Network (SONET)/Synchronous Digital Hierarchy (SDH) physical layer, carrier networks can achieve data rates of up to several hundred megabits per second (Mbps). However, efforts to meet the bandwidth demand for remote access have been beset by the limitations of the existing twisted-pair copper cable infrastructure (i.e., access network) provided between a carrier's central office (CO) and a subscriber's remote site, typically referred to as the local loop. In the telecommunications art, these limitations are sometimes collectively described as the "last mile" problem.

Current access network solutions that attempt to avoid the bottleneck created by the last-mile problem involve the use of fiber optic technology in the local loop also. As with the high-speed carrier networks, the fiber-based local loop infrastructures are typically architected using SONET as the physical layer technology. With recent developments in optical components and related opto-electronics, in addition to improvements in network design, broadband access is now becoming commonplace.

Moreover, coupled with the phenomenal growth in the popularity of the Internet, there has been a tremendous interest in using packet-switched network (PSN) infrastructures (e.g., those based on Internet Protocol (IP) addressing) as a replacement for the existing circuit-switched network (CSN) infrastructures used in today's telecommunications networks. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

As can be appreciated by one skilled in the art, concomitant with the aforesaid developments, access networks are being required to handle ever greater amounts of traffic. Whereas an access network node may be provided with an increased number of links in order to handle raw transport bandwidth needs, various internal architectural constraints necessarily follow, especially with respect to the switching functionality of the node.

It is well-known that the switching functionality of telecommunications network nodes, including access terminals, is vital to the performance of the deployed infrastructure. Essentially, the demand for greater number of links to be provisioned for an access terminal translates into a need for a more robust and sophisticated system for storing and processing bandwidth at the switching "fabric" of the terminal.

Conventionally, a time slot interchanger (TSI) mechanism is employed for effectuating a terminal's switching functionality. One existing solution for storing and processing more bandwidth at the TSI is to increase the size of the memory and associated hardware supporting the TSI. Whereas this solution and related variants can be effective in some implementations, they are nonetheless beset with certain shortcomings and deficiencies. First, the additional memory adds hardware cost to the system and introduces a greater probability of error. Moreover, implementing additional memory typically requires a more sophisticated busing structure which adds further complexity to the system. Further, the increased amount of hardware uses valuable "real estate" in today's already crowded access products where stringent form factor requirements exist. Additionally, the current hardware solutions make upgrading of extant access products difficult.

SUMMARY OF THE INVENTION

Accordingly, the present invention advantageously provides a bandwidth grooming functionality solution in an access network element in order to reduce the amount of data storage required by a switching module disposed therein. In one exemplary embodiment, the switching module comprises a Digital Signal (DS)-0 switching function such as a time slot interchanger (TSI) provided with the access network element. A plurality of communication links are coupled to the switching module, wherein each communication link is preferably identified by an address identifier. An allocation storage unit is operable to store the addresses of a select subset of the links in response to a control unit having control memory. A mechanism is provided for selecting the links based on the stored addresses for transmitting data to a data storage unit coupled to the switching module, thereby obviating the need for a much larger data storage unit.

In one aspect, the present invention is directed to a bandwidth grooming apparatus for a telecommunications network element such as an access node. A switching module of the node is operably coupled to a plurality of links, wherein each link has an address identifier and is operable to transport a datastream to the switching module for switching. An allocation storage unit is included that is operable to store, responsive to a control unit, address identifiers of at least a sub-plurality of the links. A multiplexer is available for selecting, based on the contents of the allocation storage unit, one or more links among the complement of links so as to provide the datastreams supported by the selected links to a data storage unit coupled to the switching module.

In another aspect, the present invention is directed to a bandwidth grooming method operable with a switching module of a telecommunications network element, wherein the switching module is operably coupled to a plurality of links. The method commences by assigning an address to each of the plurality of links, either by way of a dynamic configuration or other means. An allocation memory is populated with the addresses associated with at least a sub-plurality of the links. Thereafter, data from the links is transferred, for purposes of switching, to a data memory associated with the switching module, wherein the data is taken from a subset of the links based on the addresses stored in the allocation memory.

In an exemplary embodiment, the links are comprised of a plurality of Subscriber Bus Interface (SBI) links, each operating to support a 32-byte time slot format. In another exemplary embodiment, the links can be Virtual Tributary (VT) links operating with a 27-byte time slot format. In a further implementation, both VT and SBI links may co-exist. Preferably, the allocation storage unit is populated with the addresses of only active links as determined by a control unit that monitors the activity on the links. Also, the allocation storage is dimensioned to accommodate at least the address range of the links (e.g., each address requiring a predetermined number of bits) and may be comprised of a device selected from the group that includes, for instance, a dynamic random access memory (DRAM) structure, a static random access memory (SRAM) structure, an electrically programmable read-only memory (EPROM) structure, an electrically erasable programmable read-only memory ($E^2PROM$) structure, a Flash memory structure, and a field-programmable device, and the like. Moreover, as a further variation, the allocation memory may be provided as part of a gate array device having appropriate logic.

BRIEF DESCRIPTION OF THE DRAWINGS

The accompanying drawings are incorporated into and form a part of the specification to illustrate the preferred embodiments of the present invention. Various advantages and features of the invention will be understood from the following Detailed Description taken in connection with the appended claims and with reference to the attached drawing figures in which:

DETAILED DESCRIPTION OF THE DRAWINGS

Preferred embodiments of the invention will now be described with reference to various examples of how the invention can best be made and used. Like reference numerals are used throughout the description and several views of the drawings to indicate like or corresponding parts, wherein the various elements are not necessarily drawn to scale.

Figure 1:
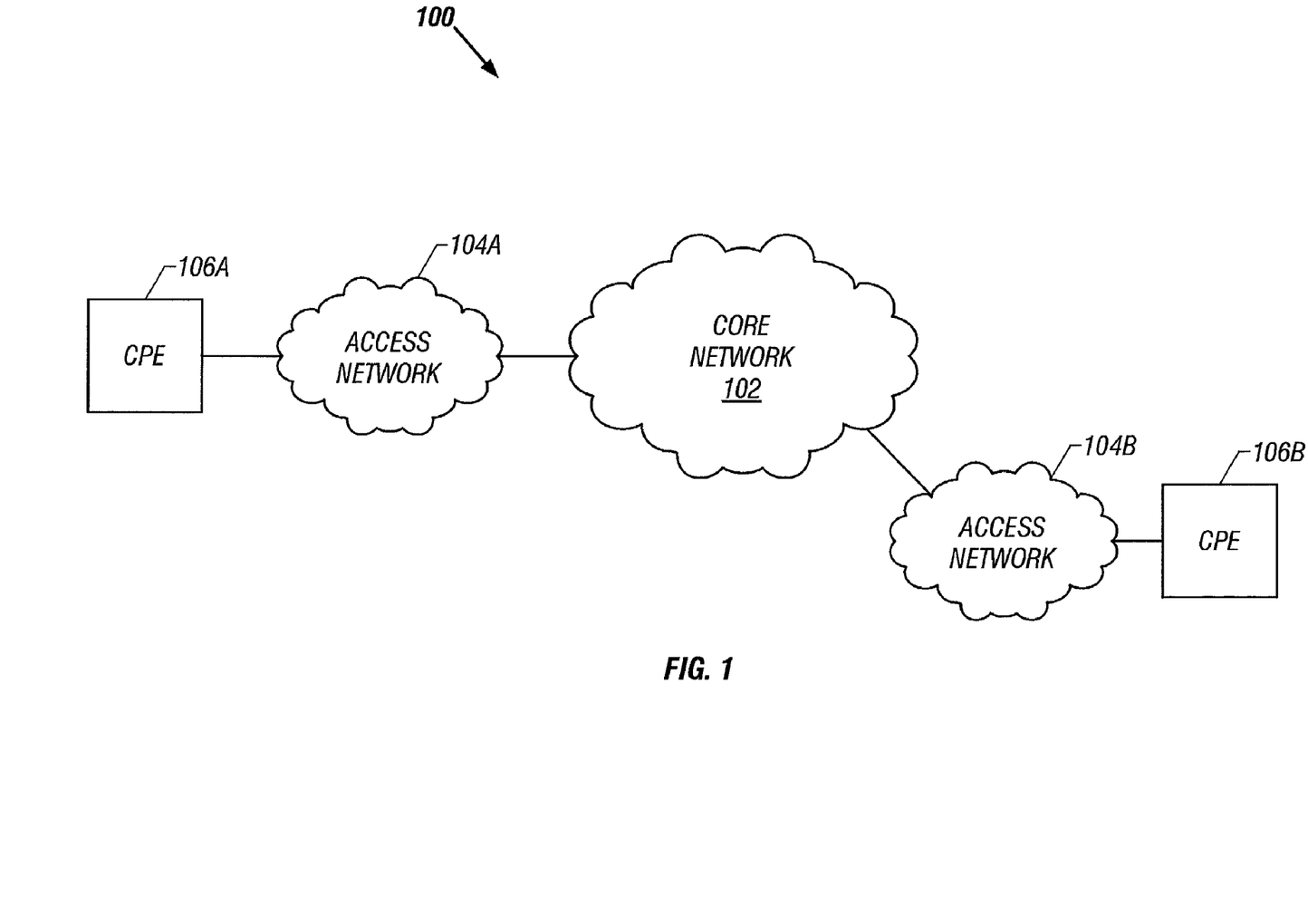
FIG. 1 depicts an exemplary telecommunications network arrangement having an access network portion wherein the teachings of the present invention may be advantageously practiced.

Referring now to FIG. 1, depicted therein is an exemplary network arrangement 100 having one or more access network portions, wherein the teachings of the present invention may be advantageously practiced for providing grooming functionality in an access network element. The exemplary network arrangement 100, comprising a core transport network 102 and access network portions 104A and 104B, is preferably operable to support telecommunications, data communications, or any combination thereof involving diverse media such as voice, audio, video, graphics, data and assorted multimedia. The core transport network 102 may be provisioned as a circuit-switched network (CSN), packet-switched network (PSN), or an integrated hybrid network capable of next-generation network (NGN) service infrastructure. In an exemplary embodiment, the Public Switched Telephone Network (PSTN) (for wireline communications), the Public Land Mobile Network (PLMN) (for wireless communications), or any combination thereof may be provided as the CSN. Where the core network 102 is implemented as a packet network, it may be preferably comprised of a network operable with Internet Protocol (IP), Frame Relay (FR), Asynchronous Transfer Mode (ATM), and/or other applicable technologies.

The access network portions 104A and 104B are disposed between end users (i.e., subscribers) exemplified by customer premises equipment (CPE) 106A, 106B, and the core network 102. It should be appreciated that although isolated CPE units are illustrated in this FIG., they may also be disposed in a private network such as a home area network (HAN), customer premises network (CPN), or a premises distribution network (PDN). Furthermore, the CPE units may be comprised of any known or heretofore unknown Integrated Access Devices (IADs) operable with diverse media. The access network portions 104A, 104B are operable to provide remote access to the subscribers by means of various Point-of-Interface (POI) nodes and Point-of-Presence (POP) nodes interconnected via any suitable wireline, wireless, narrowband, or broadband local network. By way of example, such a local network may be implemented using well known technologies such as the Integrated Services Digital Network (ISDN), Digital Subscriber Line (DSL) and its variants, Fiber In The Loop (FITL) and its variants, Hybrid Fiber/Coaxial (HFC) cable technologies, or Wireless Local Loop (WLL) technologies. Additionally, the exemplary access network portions 104A and 104B may be comprised of a converged local network in further embodiments of the present invention.

In a presently preferred exemplary embodiment of the present invention, the access network portion (e.g., access network 104A and 104B) is provided as a fiber-based embodiment depending on cost, availability of appropriate local infrastructure, services supported, etc. For example, implementations such as Fiber To The Home (FTTH), Fiber To The Curb (FTTC), Fiber To The Neighborhood (FTTN), and other FITL variants may be architected as a digital loop carrier (DLC) for providing integrated, broadband access services to the subscribers. The fiber-based loop carrier system is preferably at least operable with a suitable physical layer infrastructure such as the Synchronous Optical Network (SONET) technology or its companion, the Synchronous Digital Hierarchy (SDH), which is similar to SONET except that its multiplexing hierarchy is a subset of the SONET multiplexing scheme.

Figure 2:
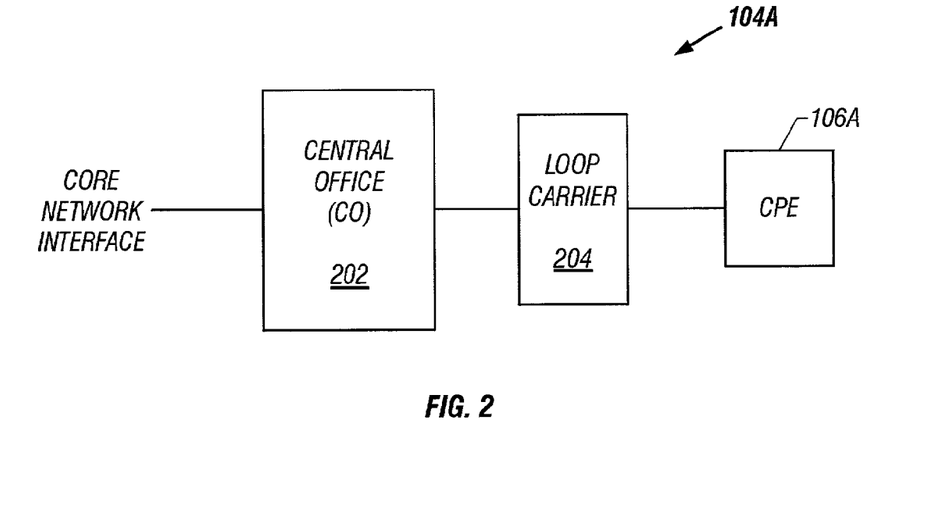
FIG. 2 depicts a high level conceptualization of an access network portion involving a loop carrier in conjunction with a central office.

FIG. 2 depicts a high level conceptualization of the exemplary access network portion (e.g., access network 104A) involving a loop carrier 204 in conjunction with a central office (CO) 202. An exemplary IAD, for instance CPE 106A, is coupled to the loop carrier 204 operable to multiplex the access loop signal between the equipment and the CO 202 with the other loop signals. The POI equipment located at the CO 202 is operable, in turn, to provide interface connectivity to the core network.

In accordance with the SONET requirements, the loop carrier 204 is preferably operable with a broad range of Optical Carrier (OC) signals, e.g., OC-3, OC-12, OC-48, et cetera, and the electrical equivalents corresponding thereto, namely, Synchronous Transport Signal STS-3, STS-12, STS-48, et cetera. SONET, as the name implies, uses a synchronous transmission scheme, with a SONET frame transmitted every 125 microseconds. Each frame is logically organized as a two-dimensional array of bytes whose size is dependent on the channel rate. The basic SONET channel is an STS-1 (corresponding to an OC-1) which consists of frames that have 810 bytes organized in 9 rows by 90 columns. At 8,000 frames per second, this gives a raw channel rate of 51.84 Mbps. Since the overhead for managing the SONET line and section equipment consumes 3 of 90 columns (leaving 87 columns of payload, called the Synchronous Payload Envelope or SPE) and the path overhead typically comprises one column, a net user data rate of 49.536 Mbps (86 columns×9 rows×8 bits×8000 frames/second) is available per STS-1 channel.

Data rates higher than STS-1 are obtained by multiplexing multiple STS-1 signals. For example, three STS-1 signals can be byte-interleaved to form an STS-3 signal that operates at 155.52 Mbps. Another form of multiplexing is to concatenate the overhead and payload bytes of multiple STS-1 signals, for example, where an STS-3c frame contains 9 overhead columns and 261 columns for the SPE, giving rise to the data rate of 152.52 Mbps. In the general case, an STS-n frame is an electrical signal having n-tuples of STS-1 frames which, when modulated over an optical carrier, is referred to as an OC-n optical signal.

Transmission rates lower than STS-1 can be obtained by subdividing the payload into what are known as Virtual Tributaries (VTs) which can support data rates from Digital Signal DS-1 (operating at 1.544 Mbps) to DS-2 (6.312 Mbps). An STS-1 signal can be logically divided into VTs having separate identities, whereby each VT is operable to carry the same amount of payload through the fiber. Because the data within each VT retains its own ID, it can be easily separated from the rest of the STS-1 signal. Accordingly, where a loop carrier system traverses a number of nodes or sub-nodes (i.e., partitions or shelves within a node) appropriate VTs may be "dropped" at each node/sub-node for processing. VTs are also useful when a SONET-based access network interfaces with another network based on the Pleisochronous Digital Hierarchy (PDH) which is built upon DS-0 (64 Kbps) channels. As will be seen hereinbelow in additional detail, the VTs provided to a switching module within an access node can be "groomed" so that data storage requirements associated therewith can be minimized.

Figure 3:
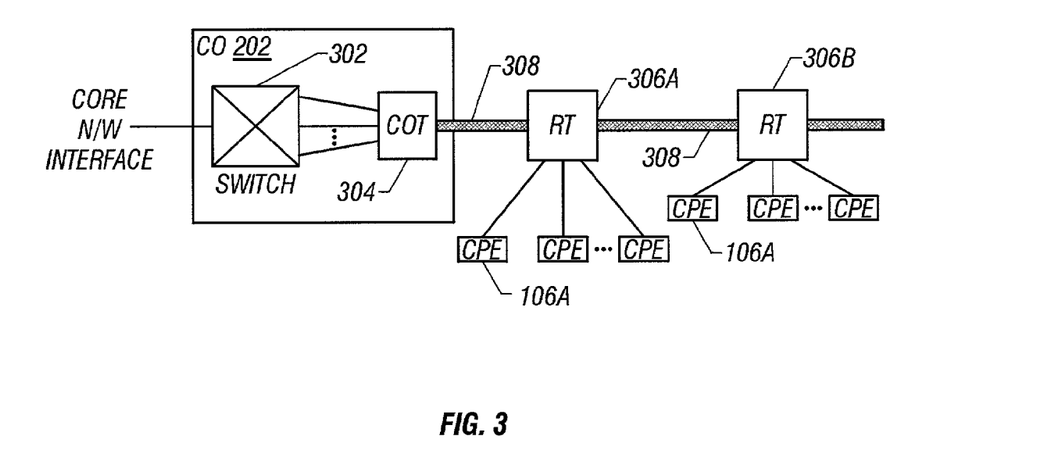
FIG. 3 depicts an exemplary embodiment of a loop carrier system having a plurality of nodes (or, terminals) wherein bandwidth grooming functionality may be provided in a terminal in accordance with the teachings of the present invention.

Referring now to FIG. 3, depicted therein is an exemplary embodiment of a fiber-based loop carrier system having a plurality of nodes wherein grooming functionality may be provided in an node in accordance with the teachings of the present invention. The loop carrier nodes, which may also be referred to as access network nodes or terminals (more generically, telecommunications nodes), may be organized in one of several topologies for purposes of the present invention and are comprised of two forms depending on their location in the access loop. When co-located at a CO, the loop carrier node is referred to as a central office terminal (COT). Reference numeral 304 exemplifies a COT coupled to a CO switch 302 that forms part of CO 202. Other loop carrier nodes external to the CO 202 are referred to as remote terminals (RTs), e.g., RT 306A and 306B.

Fiber paths 308, preferably operable to carry signals of OC-3 or higher rates, are used for interconnecting the COT 304 and RTs, e.g., RT 306A and 306B, in a particular topology. Where only one RT is coupled to the COT 304, the resultant two-node arrangement is referred to as a point-to-point loop carrier system. On the other hand, if multiple RTs 306A and 306B are coupled in a linear fashion, either a single feeder Multiple RT (MRT) system or a dual feeder MRT system may be obtained. In a single feeder MRT system, the RTs 306A and 306B are located on only one side of the COT 304, as exemplified in this FIG. In the dual feeder MRT system, the RTs 306A and 306B are disposed on both sides of COT 304, which sides are conventionally referred to as "East" and "West" sides. Accordingly, fiber optic cable emanate from the COT 304 and run in two different directions relative thereto, each branch feeding one or more RTs.

In a further exemplary embodiment, the loop carrier system may be arranged in a ring topology. For example, a Unidirectional Path Switched Ring (UPSR) topology is obtained where the westernmost and easternmost nodes of a dual feeder MRT are connected to each other. As a matter of convention, the East direction from the COT carries the communication traffic, whereas the West direction from the COT is provided as the "protect" direction in case the East direction cable is cut or its performance degrades to a predetermined level. It should be understood by one skilled in the art that in addition to the COT and RT access loop nodes, the exemplary loop carrier system may also include other equipment such as, for example, Optical Network Units (ONUs) that serve end users that are far enough away from each other that it isn't economical to connect all of them to an RT.

Figure 4A:
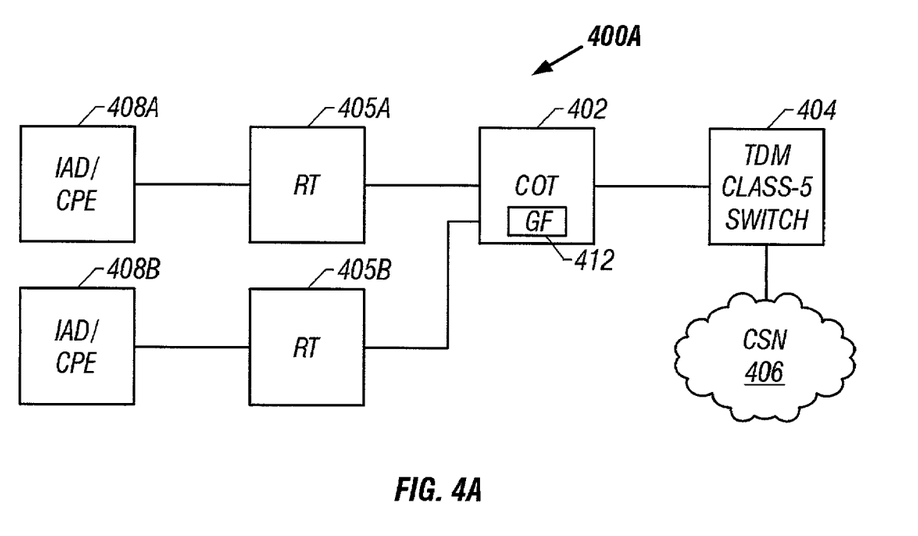
FIG. 4A depicts an exemplary embodiment loop carrier system wherein a bandwidth grooming function is provided in a Central Office Terminal (COT)

FIG. 4A depicts an exemplary loop carrier system 400A where a bandwidth grooming function 412 is provided in a COT 402. In this arrangement, COT 402 provides connectivity to a conventional Class 5 switch 404 operable with time-division multiplexed (TDM) communication data, which TDM switch 404 is connected to a CSN 406. Further, IAD/CPE 408A and 408B are illustrative CPE units coupled to respective RTs 405A, 405B which in turn are coupled to COT 402 in any topology.

The bandwidth grooming function (GF) 412 of the present invention is preferably operable to minimize the data storage requirements of a switching function (e.g., a DS-0 switching function) of a node. More specifically, the grooming function 412 is operable to reduce the memory requirements to support the bandwidth of VT links (e.g., split from the fiber optics), Subscriber Bus Interface (SBI) links (coupled to the subscriber cards or line cards) or other transport links, which are switched by the switching function using a time slot interchanger (TSI). Preferably, the grooming function 412 provides a dynamically-configurable channel-selection mechanism operable to select only active transport links whereby data from the selected links is provided to the data storage unit associated with the switching module. To achieve these ends, the grooming function 412 employs a separate allocation storage unit in addition to the data storage, as will be discussed in more detail below.

Figure 4B:
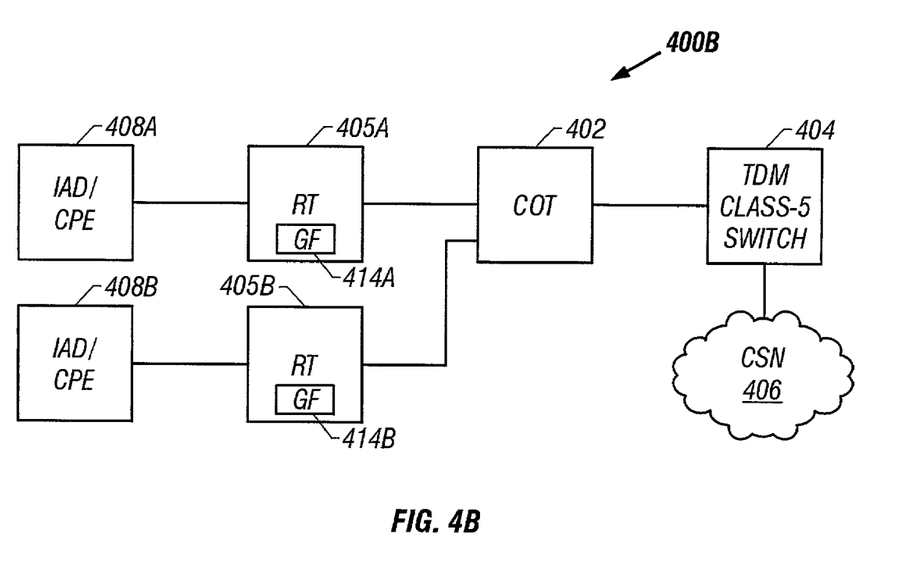
FIG. 4B depicts an exemplary embodiment loop carrier system wherein a bandwidth grooming function is provided in a remote terminal (RT)

FIG. 4B depicts an exemplary loop carrier system 400B where the grooming function is provided in an RT rather than a COT. By way of example, grooming modules 414A and 414B are provided with RTs 405A and 405B, respectively. As before, RT 405A and RT 405B provide connectivity to COT 402 which is connected to the TDM-Class 5 switch 404 in any known topology. Furthermore, although not specifically shown in either FIG. 4A or 4B, either COT, RT, or both, may be coupled to a PSN via appropriate packet switch interfacing in order to support integrated services.

Figure 5:
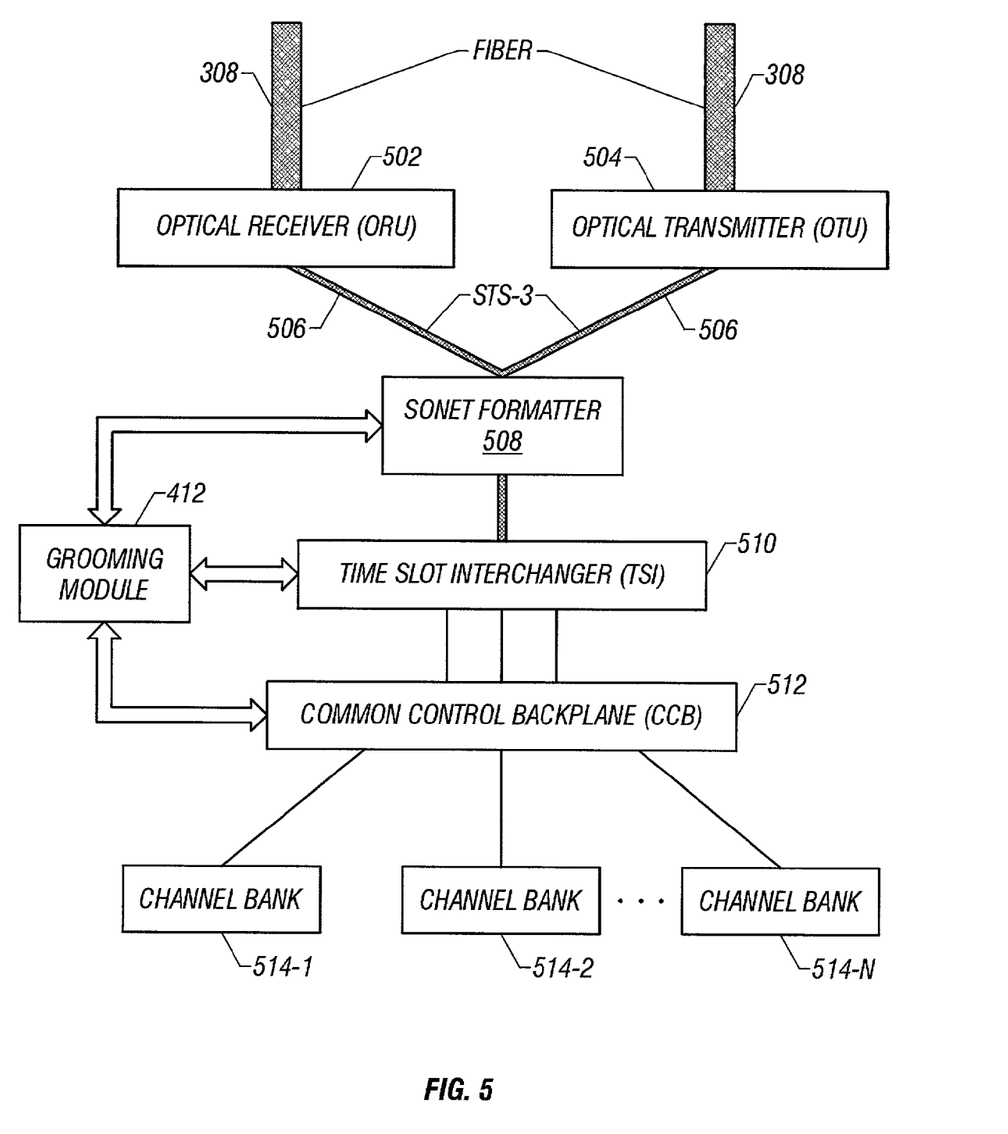
FIG. 5 depicts a functional block diagram of an exemplary terminal of an access network, wherein a bandwidth grooming function is associated with a time slot interchanger (TSI) in accordance with the teachings of the present invention.

FIG. 5 depicts a functional block diagram of the exemplary SONET-capable node, such as COT 402 or RT 405A or RT 405B, with additional detail. Optical receiver units (e.g., ORU 502) and optical transmit units (e.g., OTU 504) are preferably provided as high-speed unit (HSU) optical assemblies, preferably with redundancy, that directly interface to the fiber path 308. The ORU 502 is operable to receive an OC-n signal and convert it into its STS-n electrical equivalent. Similarly, the OTU 504 is operable to convert an STS-n signal and convert it into the OC-n carrier signal associated therewith. For example, where an OC-3 carrier signal is employed for transmission on the fiber paths 308, the ORU 502 and OTU 504 assemblies are provided with the capability to operate with STS-3 signals propagated on electrical paths 506 associated therewith.

The optical assemblies 502 and 504 are coupled via the electrical paths 506 to a SONET formatter assembly comprising a plurality of formatter cards 508 which are operable to accept communication signals from time slot interchanger (TSI) cards 510 and convert them into appropriate STS-n signals. A common control backplane (CCB) 512 is provided for coupling the TSI cards 510, formatter cards 508, and the OTU/ORU cards on a common motherboard. The channel bank assemblies 514-1 through 514-N, which may be populated with different subscriber cards (or, line cards) for supporting various kinds of communication services, are coupled to the CCB 512 via appropriate cabling that supports a plurality of Subscriber Bus Interface (SBI) links. The TSI 510 is therefore operable to switch either incoming VTs (from the fiber optics) or SBI links (from the channel bank side) or, as in some cases, outgoing VTs supported by broadband resource cards.

As alluded to hereinabove, the grooming functionality module 412 is operable to "groom" the communication transport links (i.e., VT links, SBI links, etc.) entering the TSI so that storage requirements associated therewith for purposes of data switching are minimized. It should be appreciated that the grooming module 412, TSI module 510 and related control components (e.g., a control processor and associated control memory) (not shown in this FIG.) may be comprised of hardware components, software components, firmware components or any combination thereof. It should also be understood by one skilled in the art that FIG. 5 is a high-level functional block diagram wherein the various components of the SONET-capable node may be integrated in any fashion. For example, the grooming function 412 may be integrated into the TSI cards 510, along with any control components.

Figure 6:
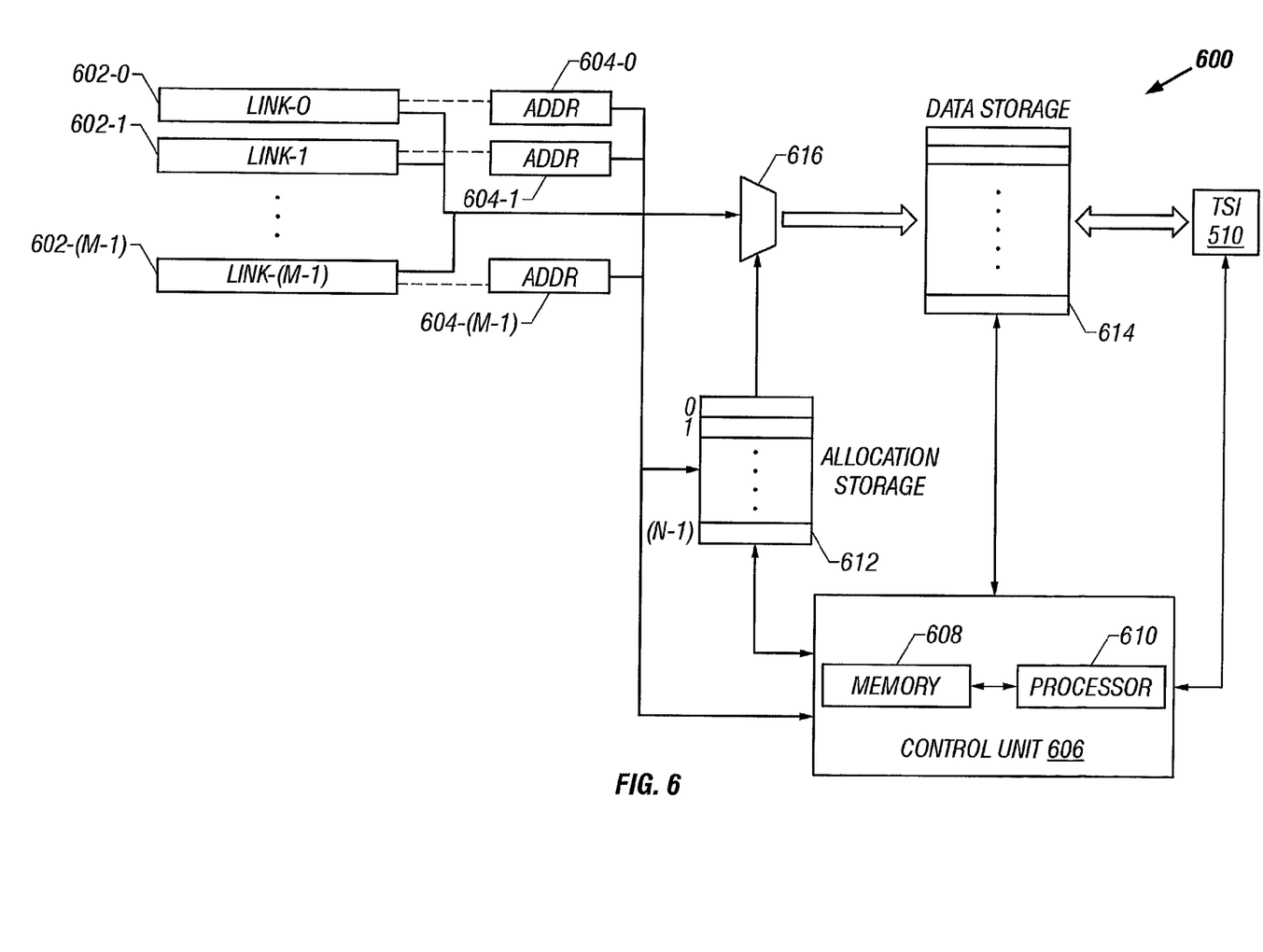
FIG. 6 depicts a functional block diagram of an exemplary bandwidth grooming system.

Referring now to FIG. 6, shown therein is a system 600 embodying the bandwidth grooming functionality and apparatus of the present invention. A plurality of links, reference numerals 602-0 through 602-(M-1), are exemplary of the various communication transport links operably associated with the TSI, each of which supports a datastream that is to be switched by the switching functionality of the TSI. As pointed above, these links may be comprised of VT links, SBI links and the like, or any combination thereof. In one exemplary implementation, the VT links are operable to support datastreams having a 27-byte time slot format, whereas the SBI links support datastreams with a 32-byte time slot format. Each link is identified by an address identifier that is assigned by a control unit 606 having a processor 610 and associated control memory 608. Reference numerals 604-0 through 604-(M-1) refer to the M addresses associated with the links.

In accordance with the teachings of the present invention, an allocation storage unit 612 is provided for storing the addresses of at least a sub-plurality of the communication links. The allocation storage unit 612 is preferably provided with N locations, each location having at least a number of bits capable of accommodating a link address. In some configurations, the allocation storage locations can be extra wide with additional bits, for storing user-defined control information specific to the link address stored thereat. For example, by increasing the size of each allocation storage location by 1 bit, a second block of links could be accommodated.

In a presently preferred exemplary embodiment, it is provided that N<M, and the control unit 606 is operable to determine which link addresses need to be stored in the allocation storage unit 612. In one exemplary implementation, the control unit 606 monitors the activity on the links such that the addresses of only active links are stored. Thus, it should be appreciated that the contents of the allocation storage can be dynamically configured, based on activity and other considerations. As to determining the size (N) of the allocation storage unit 612, appropriate network traffic engineering principles can be applied to evaluate a theoretical limit which indicates the maximum number of active links at any time. For example, a 256-location storage unit may be used in a terminal where up to 256 links can be active at one time regardless of the total number of links coupled to the TSI.

Additionally, the allocation storage unit 612 may be formed from any device selected from the group that includes, for instance, a dynamic random access memory (DRAM) structure, a static random access memory (SRAM) structure, an electrically programmable read-only memory (EPROM) structure, an electrically erasable programmable read-only memory ($E^2$PROM) structure, a Flash memory structure, and a field-programmable device, and the like. Moreover, as a further variation, the allocation memory may be provided as part of a gate array device having appropriate logic.

A link selection mechanism operable responsive to the contents of the allocation storage 612 is provided in order to determine data from which link should be transmitted to a data storage 614 associated with TSI 510 for switching purposes. Preferably, this functionality may be effectuated by way of a multiplexer 616 whose control input is coupled to the allocation storage unit 612 and selection input(s) is(are) coupled to the links. Preferably, the data storage 614 is comprised of N segments that correspond to the locations of the allocation storage unit 612. Further, each data storage segment must be of sufficient size to accommodate the full data frame per time slot for the selected link. Thus, in the case of exemplary VT links, the segments must be able to accommodate the 27-byte frames. However, the SBI links require segments of at least 32 bytes in the data storage 614.

The allocation memory of the present invention is operable to support a maximum of N links at any given time, where M>N>0 as discussed. Therefore by utilizing the grooming function of the present invention, the data memory 614, at a minimum, must support N time slots. By implementing the allocation memory, accordingly, the present invention decreases the size of the data memory by (M–N) time slots.

Figure 7:
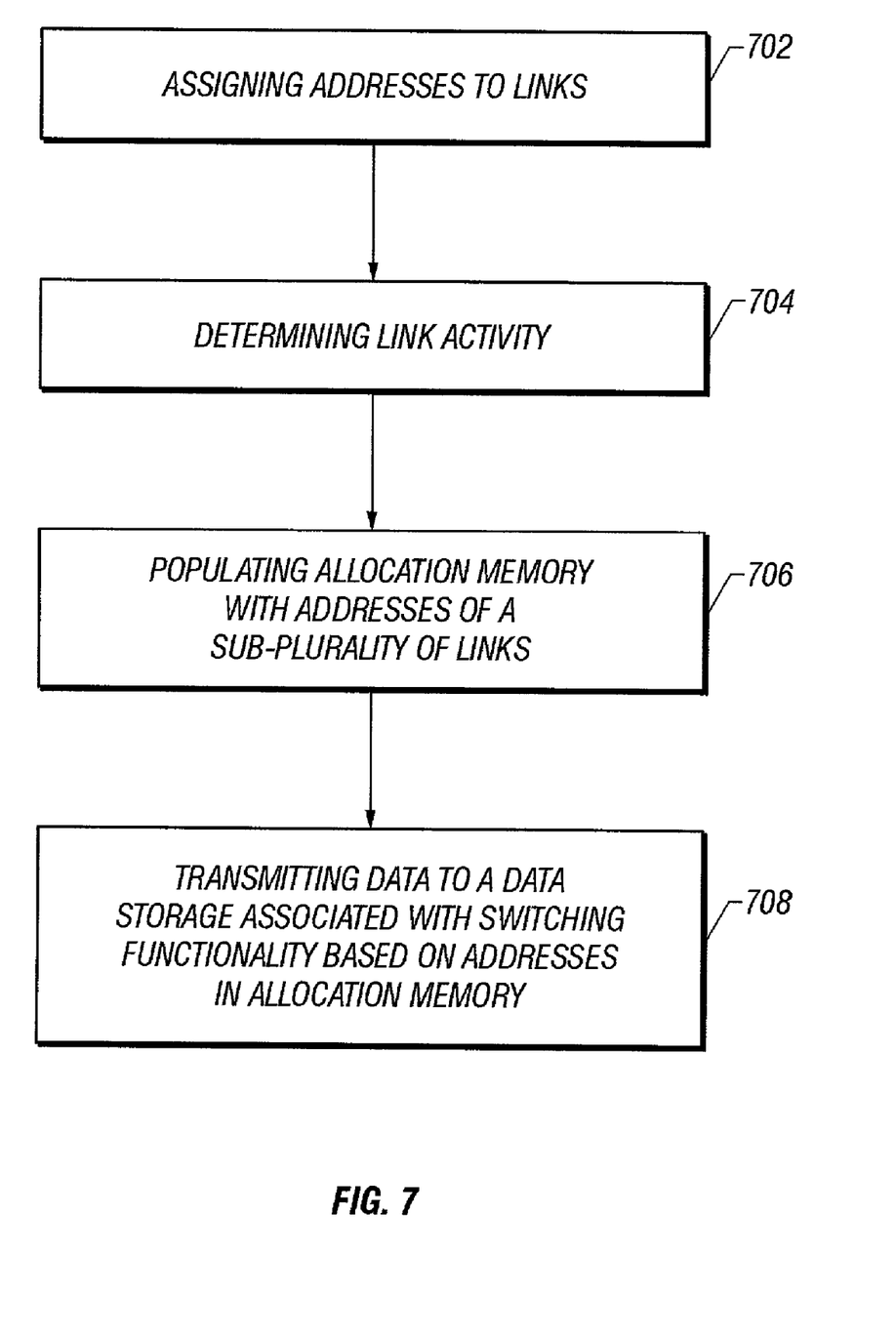
FIG. 7 is a flow chart of the various steps involved in an exemplary methodology for providing a bandwidth grooming function in accordance with the teachings of the present invention.

FIG. 7 is a flow chart of the various steps involved in an exemplary methodology for grooming bandwidth in an access network element. A control unit assigns each link an address (step 702). At any time slot, the control unit determines which links are in service or "active" (step 704). The control unit populates allocation memory locations with the addresses of the active links (step 706). Any number of links may be active at any given time. Additionally, it should be recognized that the active links may be SBI links, VT links, links compliant with other protocols, or any combination thereof. A link selection mechanism is operable to receive a control input based on the contents of the locations of the allocation memory, preferably in a sequential manner, to determine the links from which the data is to be transmitted to corresponding segments in a data storage unit associated with the switching function of a terminal (step 708).

It should be apparent to one skilled in the art that the data stored in the links may be comprise voice, data, video, multimedia or any other format. Moreover, as pointed out before, the links may be VT links, such as VT 1.5s, VT 2s, VT 3s, or VT6s. Alternatively, the links may be conceptualized as ingress or egress links, depending on the data flow with respect to the terminal. Additionally, the links may be comprised of standardized line card links or proprietary links such as the SBI links.

Based upon the foregoing Detailed Description, it should be readily apparent that the present invention advantageously provides an innovative and efficient solution for bandwidth conservation wherein an access terminal employing the present invention can support more bandwidth (i.e., increased number of links) without the burden of increasing hardware. Therefore, the grooming function of the present invention saves the cost associated with larger memory and complex busing structures. Additionally, the grooming function of the present invention conserves valuable "real estate" in an access node product.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the appended claims.

What is claimed is:

1. A bandwidth grooming apparatus for a telecommunications network element for providing dynamically-configurable data link-selection, comprising:
a switching module operably coupled to a plurality of links, wherein each link has an address identifier and is operable to transport a datastream to said switching module for switching, wherein a datastream is presented to said switching module via a data storage unit;
an allocation storage unit operable to store, responsive to a control unit, address identifiers of at least a sub-plurality of said links; and
a multiplexer operable to select, responsive to the contents of said allocation storage unit, at least one link among said plurality of links for providing a datastream supported by said at least one link to said data storage unit coupled to said switching module, wherein said data storage unit can only store a sub-plurality of said plurality of links;
said allocation storage unit is first populated with address identifiers of active links of said plurality of links, wherein additional links can be coupled to said switching module without increasing the capacity of said data storage unit.

2. The bandwidth grooming apparatus for a telecommunications network element as recited in claim 1, wherein said allocation storage unit comprises a memory device selected from the group consisting of a dynamic random access memory (DRAM) device, a static random access memory (SRAM) device, an electrically programmable read-only memory (EPROM) device, an electrically erasable programmable read-only memory ($E^2$PROM) device, and a Flash memory device.

3. The bandwidth grooming apparatus for a telecommunications network element as recited in claim 1, wherein the contents of said allocation storage unit are dynamically configurable.

4. The bandwidth grooming apparatus for a telecommunications network element as recited in claim 1, wherein said links comprise Subscriber Bus Interface (SBI) links, each having a 32-byte time slot format.

5. The bandwidth grooming apparatus for a telecommunications network element as recited in claim 1, wherein said links comprise Virtual Tributary (VT) links, each having a 27-byte time slot format.

6. The bandwidth grooming apparatus for a telecommunications network element as recited in claim 1, wherein said links comprise at least one of a Virtual Tributary (VT) link having a 27-byte time slot format and a Subscriber Bus Interface (SBI) link having a 32-byte time slot format.

7. The bandwidth grooming apparatus for a telecommunications network element as recited in claim 6, wherein said plurality of links comprise 256 links.

8. The bandwidth grooming apparatus for a telecommunications network element as recited in claim 1, wherein said address identifiers comprise fixed addresses.

9. The bandwidth grooming apparatus for a telecommunications network element as recited in claim 1, wherein said address identifiers comprise configurable addresses.

10. The bandwidth grooming apparatus for a telecommunications network element as recited in claim 1, wherein said sub-plurality of said links comprise links determined to be active by said control unit.

11. The bandwidth grooming apparatus for a telecommunications network element as recited in claim 1, wherein said switching module comprises a DS-0 switching function.

12. A bandwidth grooming method operable with a switching module of a telecommunications network element, wherein said switching module is operably coupled to a plurality of links, comprising the steps:
assigning an address to each of said plurality of links;
populating an allocation memory with addresses associated with at least a sub-plurality of said links;
transmitting data to a data memory associated with said switching module, wherein said data is taken from said plurality of links based on said addresses stored in said allocation memory, and wherein said data memory can only store a sub-plurality of said plurality of links; and
said allocation storage unit is first populated with address identifiers of active links of said plurality of links, wherein additional links can be coupled to said switching module without increasing the capacity of said data storage unit.

13. The bandwidth grooming method operable with a switching module of a telecommunications network element as recited in claim 12, wherein said addresses of said plurality of links are dynamically assigned.

14. The bandwidth grooming method operable with a switching module of a telecommunications network element as recited in claim 12, wherein said step of populating an allocation memory is performed based at least in part upon determining which of said plurality of links are active.

15. The bandwidth grooming method operable with a switching module of a telecommunications network element as recited in claim 12, wherein said data comprises a 32-byte time slot format per link.

16. The bandwidth grooming method operable with a switching module of a telecommunications network element as recited in claim 12, wherein said data comprises a 27-byte time slot format per link.

17. The bandwidth grooming method operable with a switching module of a telecommunications network element as recited in claim 12, wherein said step of populating an allocation memory is performed responsive at least in part to a control unit.

18. The bandwidth grooming method operable with a switching module of a telecommunications network element as recited in claim 12, wherein said step of populating an allocation memory comprises the step of storing said addresses into a static random access memory (SRAM) structure.

19. The bandwidth grooming method operable with a switching module of a telecommunications network element as recited in claim 12, wherein said step of populating an allocation memory comprises the step of storing said addresses into a dynamic random access memory (DRAM) structure.

20. The bandwidth grooming method operable with a switching module of a telecommunications network element as recited in claim 12, wherein said step of populating an allocation memory comprises the step of storing said addresses into a programmable read-only memory (PROM) structure.

21. The bandwidth grooming method operable with a switching module of a telecommunications network element as recited in claim 12, wherein said step of populating an allocation memory comprises the step of storing said addresses into a electrically erasable programmable read-only memory ($E^2$PROM) structure.

22. The bandwidth grooming method operable with a switching module of a telecommunications network element as recited in claim 12, wherein said step of populating an allocation memory comprises the step of storing said addresses into a Flash memory structure.

* * * * *